US012393513B2

(12) United States Patent
Seibel et al.

(10) Patent No.: US 12,393,513 B2
(45) Date of Patent: Aug. 19, 2025

(54) SYSTEM AND METHOD FOR MANAGING METADATA ACCESS IN A LOG-STRUCTURED SYSTEM

(71) Applicant: Dell Products L.P., Round Rock, TX (US)

(72) Inventors: Christopher Seibel, Walpole, MA (US); Vamsi K. Vankamamidi, Hopkinton, MA (US); Christopher J. Jones, Plainville, MA (US); Vladimir Shveidel, Pardes-Hana (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/472,595

(22) Filed: Sep. 22, 2023

(65) Prior Publication Data

US 2025/0103490 A1 Mar. 27, 2025

(51) Int. Cl.
*G06F 12/02* (2006.01)

(52) U.S. Cl.
CPC ........ *G06F 12/0292* (2013.01); *G06F 12/023* (2013.01); *G06F 2212/154* (2013.01)

(58) Field of Classification Search
CPC ............... G06F 12/0292; G06F 12/023; G06F 2212/154; G06F 12/0868; G06F 2212/1024; G06F 2212/466

USPC .......................................................... 711/166
See application file for complete search history.

(56) References Cited

U.S. PATENT DOCUMENTS

| 2021/0081388 A1* | 3/2021 | Ding | G06F 16/1734 |
| 2023/0044942 A1* | 2/2023 | Tomlin | G06F 3/0608 |

* cited by examiner

*Primary Examiner* — Hua J Song
(74) *Attorney, Agent, or Firm* — Brian J. Colandreo; Heath M. Sargeant; Holland & Knight LLP

(57) ABSTRACT

A method, computer program product, and computing system for receiving a metadata page for storage within a log-structured metadata store. An entry may be generated within a translation table page of a translation table within the log-structured metadata store, wherein each entry of a plurality of entries within the translation table page is associated with a separate metadata page. One or more metadata page deltas for the metadata page may be recorded in the log-structured metadata store. The one or more metadata page deltas for the metadata page may be flushed to a persistent memory storage. In response to flushing the one or more metadata page deltas for the metadata page, the entry within the translation table page that is associated with the metadata page may be updated without accessing any other entry within the translation table page associated with other metadata pages.

17 Claims, 9 Drawing Sheets

SYSTEM AND METHOD FOR MANAGING METADATA ACCESS IN A LOG-STRUCTURED SYSTEM

BACKGROUND

Storage systems have components whose responsibility is to map a user-visible logical address space to an internal physical address space, and implement various features such as snapshots, data compression, data deduplication, etc. Such mapping and features may rely on different types of metadata to be implemented. This metadata (e.g., Tops, Mids, Leafs, Virtual Logical Blocks (VLBs) pointing to Physical Large Blocks (PLBs), etc.) are typically stored persistently as, e.g., four kilobyte blocks on drives and different metadata blocks reference each other by their block-addresses. These are typically known as metadata pages.

Access to these metadata pages may be common between threads of operation with some of these threads requiring exclusive access. Conventional design for metadata access requires access to the entire metadata page which needs to be exclusive for any changes applied to it regardless of the amount of content on that page that is the focus of the operation. This creates contention between threads which typically leads to increased latency which becomes visible to external clients. With the introduction of processing metadata in a log-structured system, number of metadata pages accessed is potentially increased due to Translation Table, thus adding to possible contention. This issue is exacerbated by the potential non-localization of metadata to translation pages, as what were previously disparate operations may now contend on the same translation page. In other words, the conventional design is in-place update of metadata pages and so there is no need for translation table and its associated handling to minimize contention.

SUMMARY OF DISCLOSURE

In one example implementation, a computer-implemented method executed on a computing device may include, but is not limited to, for receiving a metadata page for storage within a log-structured metadata store. An entry may be generated within a translation table page of a translation table within the log-structured metadata store, wherein each entry of a plurality of entries within the translation table page is associated with a separate metadata page. One or more metadata page deltas for the metadata page may be recorded in the log-structured metadata store. The one or more metadata page deltas for the metadata page may be flushed to a persistent memory storage. In response to flushing the one or more metadata page deltas for the metadata page, the entry within the translation table page that is associated with the metadata page may be updated without accessing any other entry within the translation table page associated with other metadata pages.

One or more of the following example features may be included. Updating the entry within the translation table page that is associated with the metadata page may include: exclusively locking the metadata page during the flushing of the one or more metadata page deltas; and exclusively locking the entry within the translation table page that is associated with the metadata page without exclusively locking any other entry within the translation table page associated with other metadata pages. Updating the entry within the translation table page that is associated with the metadata page may include updating the entry within the translation table page within an active tablet of an active-frozen tablet pair. The translation table page may be destaged to the persistent memory storage. Destaging the translation table page may include converting the active tablet to a frozen tablet; and generating a new active tablet for processing subsequent updates to the translation table page. The current translation table page may be obtained from a source tier within the persistent memory storage. The current translation table page may be updated with each entry from the translation table page of the frozen tablet, thus defining an updated translation table page. The updated translation table page may be persisted to a target tier within the persistent memory storage. A request to access the metadata page may be received; and the translation table page with the entry associated with the metadata page may be obtained from one of the source tier and the target tier.

In another example implementation, a computer program product resides on a computer readable medium that has a plurality of instructions stored on it. When executed by a processor, the instructions cause the processor to perform operations that may include, but are not limited to, receiving a metadata page for storage within a log-structured metadata store. An entry may be generated within a translation table page of a translation table within the log-structured metadata store, wherein each entry of a plurality of entries within the translation table page is associated with a separate metadata page. One or more metadata page deltas for the metadata page may be recorded in the log-structured metadata store. The one or more metadata page deltas for the metadata page may be flushed to a persistent memory storage. In response to flushing the one or more metadata page deltas for the metadata page, the entry within the translation table page that is associated with the metadata page may be updated without accessing any other entry within the translation table page associated with other metadata pages.

One or more of the following example features may be included. Updating the entry within the translation table page that is associated with the metadata page may include: exclusively locking the metadata page during the flushing of the one or more metadata page deltas; and exclusively locking the entry within the translation table page that is associated with the metadata page without exclusively locking any other entry within the translation table page associated with other metadata pages. Updating the entry within the translation table page that is associated with the metadata page may include updating the entry within the translation table page within an active tablet of an active-frozen tablet pair. The translation table page may be destaged to the persistent memory storage. Destaging the translation table page may include converting the active tablet to a frozen tablet; and generating a new active tablet for processing subsequent updates to the translation table page. The current translation table page may be obtained from a source tier within the persistent memory storage. The current translation table page may be updated with each entry from the translation table page of the frozen tablet, thus defining an updated translation table page. The updated translation table page may be persisted to a target tier within the persistent memory storage. A request to access the metadata page may be received; and the translation table page with the entry associated with the metadata page may be obtained from one of the source tier and the target tier.

In another example implementation, a computing system includes at least one processor and at least one memory architecture coupled with the at least one processor, wherein the at least one processor is configured to receiving a metadata page for storage within a log-structured metadata store. An entry may be generated within a translation table page of a translation table within the log-structured metadata store, wherein each entry of a plurality of entries within the translation table page is associated with a separate metadata page. One or more metadata page deltas for the metadata page may be recorded in the log-structured metadata store. The one or more metadata page deltas for the metadata page may be flushed to a persistent memory storage. In response to flushing the one or more metadata page deltas for the metadata page, the entry within the translation table page that is associated with the metadata page may be updated without accessing any other entry within the translation table page associated with other metadata pages.

One or more of the following example features may be included. Updating the entry within the translation table page that is associated with the metadata page may include: exclusively locking the metadata page during the flushing of the one or more metadata page deltas; and exclusively locking the entry within the translation table page that is associated with the metadata page without exclusively locking any other entry within the translation table page associated with other metadata pages. Updating the entry within the translation table page that is associated with the metadata page may include updating the entry within the translation table page within an active tablet of an active-frozen tablet pair. The translation table page may be destaged to the persistent memory storage. Destaging the translation table page may include converting the active tablet to a frozen tablet; and generating a new active tablet for processing subsequent updates to the translation table page. The current translation table page may be obtained from a source tier within the persistent memory storage. The current translation table page may be updated with each entry from the translation table page of the frozen tablet, thus defining an updated translation table page. The updated translation table page may be persisted to a target tier within the persistent memory storage. A request to access the metadata page may be received; and the translation table page with the entry associated with the metadata page may be obtained from one of the source tier and the target tier.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

DETAILED DESCRIPTION

Figure 1:
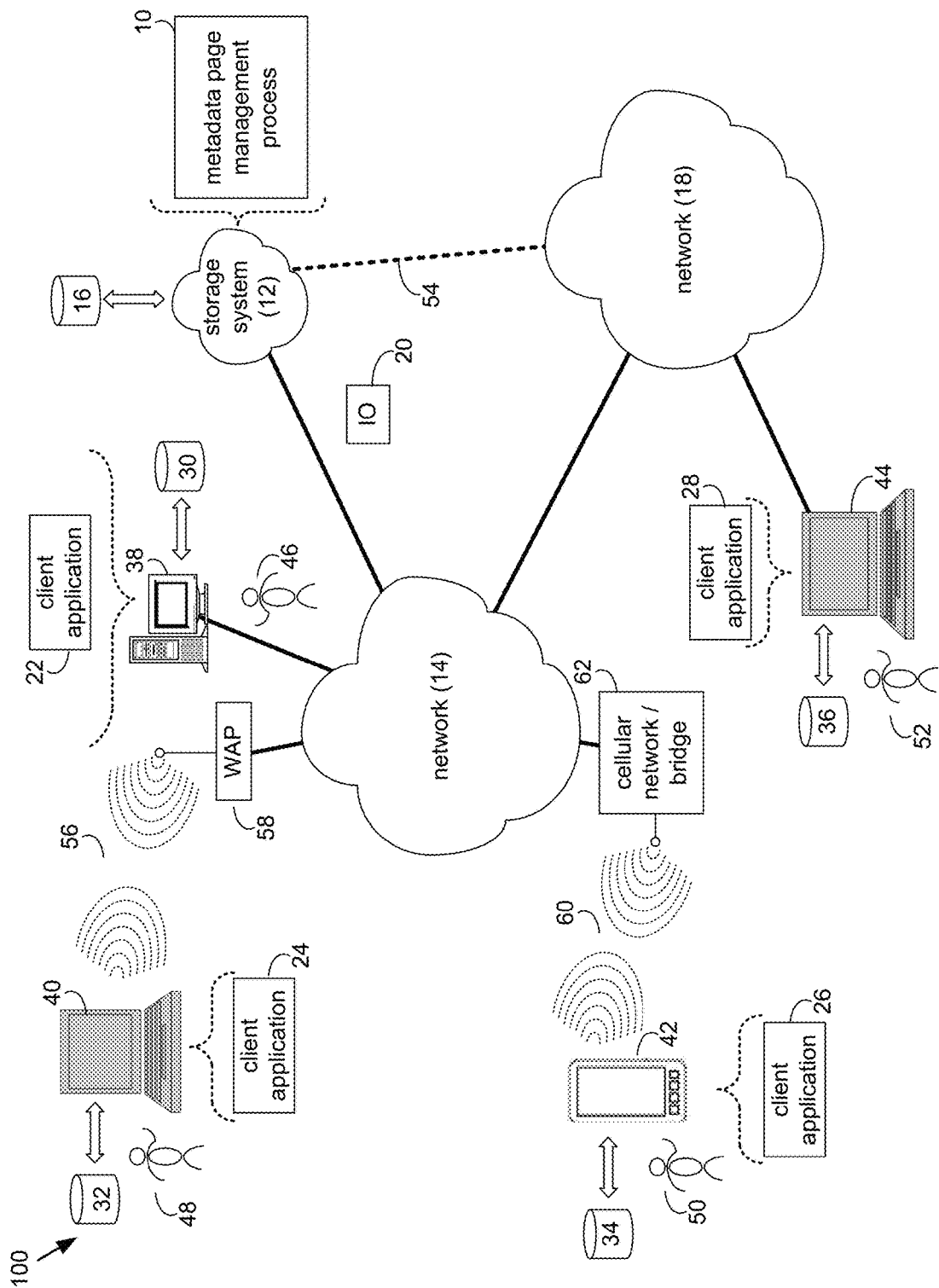
FIG. 1 is an example diagrammatic view of a storage system and a metadata page management process coupled to a distributed computing network according to one or more example implementations of the disclosure.

System Overview:

Referring to FIG. 1, there is shown metadata page management process 10 that may reside on and may be executed by storage system 12, which may be connected to network 14 (e.g., the Internet or a local area network). Examples of storage system 12 may include but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a minicomputer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of metadata page management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random-access memory (RAM); a read-only memory (ROM); and all forms of flash memory storage devices. Additionally/alternatively, some portions of the instruction sets and subroutines of metadata page management process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g., IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a metadata page management process, such as metadata page management process 10 of FIG. 1, may include but is not limited to, receiving a metadata page for storage within a log-structured metadata store. An entry may be generated within a translation table page of a translation table within the log-structured metadata store, wherein each entry of a plurality of entries within the translation table page is associated with a separate metadata page. One or more metadata page deltas for the metadata page may be recorded in the log-structured metadata store. The one or more metadata page deltas for the metadata page may be flushed to a persistent memory storage. In response to flushing the one or more metadata page deltas for the metadata page, the entry within the translation table page that is associated with the metadata page may be updated without accessing any other entry within the translation table page associated with other metadata pages.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
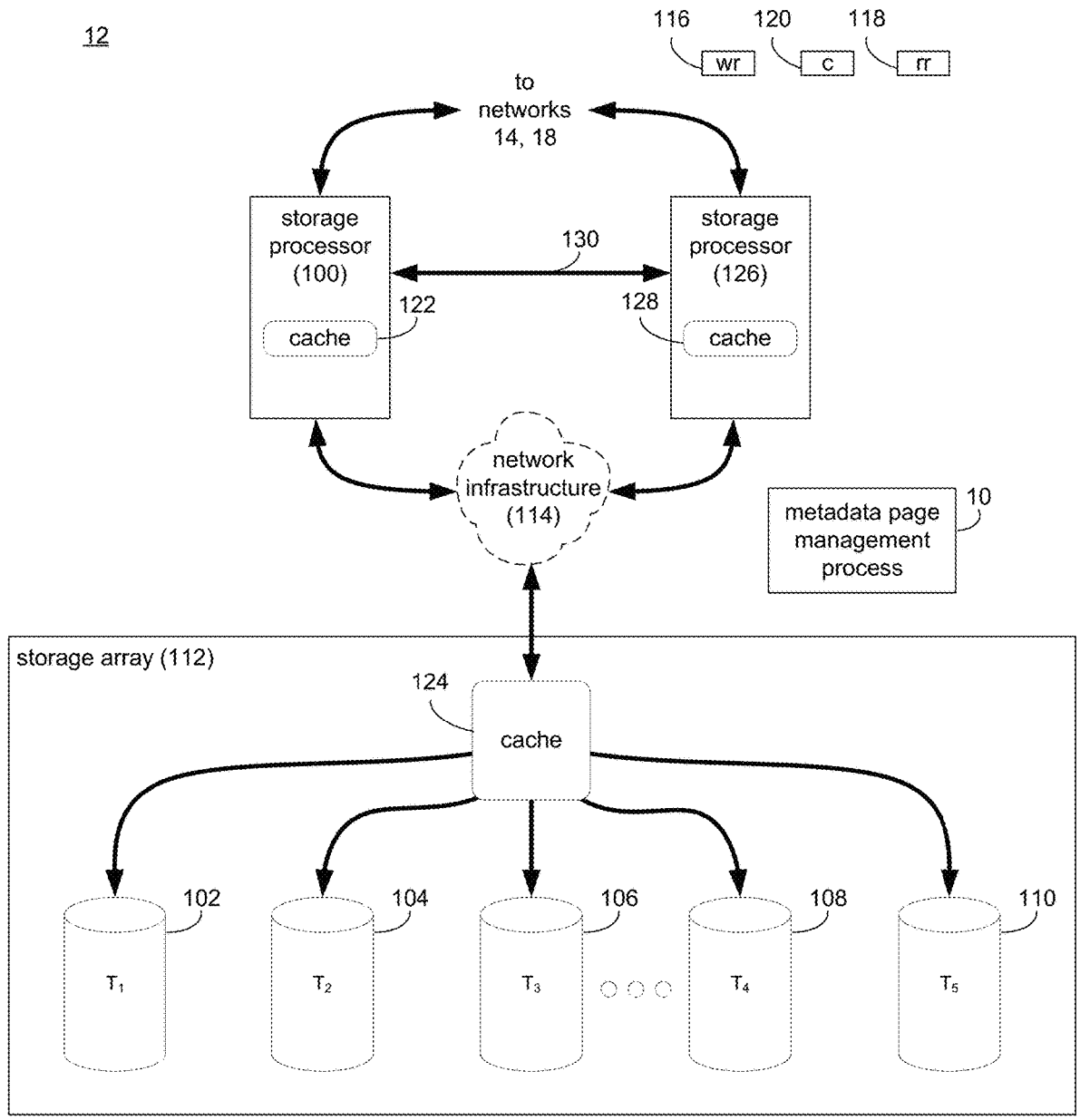
FIGS. 2-3 are example diagrammatic views of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g., storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g., the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g., the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of metadata page management process 10. The instruction sets and subroutines of metadata page management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random-access memory (RAM); a read-only memory (ROM); and all forms of flash memory storage devices. As discussed above, some portions of the instruction sets and subroutines of metadata page management process 10 may be stored on storage devices (and/or executed by processors and memory architectures) that are external to storage system 12.

As discussed above, various IO requests (e.g., IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e., a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g., one or more of storage targets 102, 104, 106, 108, and coded target 110.

As discussed above, the instruction sets and subroutines of metadata page management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of metadata page management process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g., one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 126), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 126 may function like storage processor 100. For example, during operation of storage processor 126, content 118 to be written to storage system 12 may be processed by storage processor 126. Additionally/alternatively and when storage processor 126 is configured as an application server, content 118 to be written to storage system 12 may be internally generated by storage processor 126.

Storage processor 126 may include frontend cache memory system 128. Examples of frontend cache memory system 128 may include but are not limited to a volatile, solid-state, cache memory system (e.g., a dynamic RAM cache memory system) and/or a non-volatile, solid-state, cache memory system (e.g., a flash-based, cache memory system).

Storage processor 126 may initially store content 118 within frontend cache memory system 126. Depending upon the manner in which frontend cache memory system 128 is configured, storage processor 126 may immediately write content 118 to data array 112 (if frontend cache memory system 128 is configured as a write-through cache) or may subsequently write content 118 to data array 112 (if frontend cache memory system 128 is configured as a write-back cache).

In some implementations, the instruction sets and subroutines of metadata page management process 10, which may be stored on storage device 16 included within storage system 12, may be executed by one or more processors (not shown) and one or more memory architectures (not shown) included within storage system 12. Accordingly, in addition to being executed on storage processor 126, some or all of the instruction sets and subroutines of metadata page management process 10 may be executed by one or more processors (not shown) and one or more memory architectures (not shown) included within data array 112.

Further and as discussed above, during the operation of data array 112, content (e.g., content 118) to be written to data array 112 may be received from storage processor 126 and initially stored within backend cache memory system 124 prior to being stored on e.g., one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

As discussed above, storage processor 100 and storage processor 126 may be configured in an active/active configuration where processing of data by one storage processor may be synchronized to the other storage processor. For example, data may be synchronized between each storage processor via a separate link or connection (e.g., connection 130).

Metadata Architecture:

In the context of storage systems, metadata may generally include useful internal information managed by a storage array to describe and locate user data. All modern arrays abstract the physical media and present logical (virtualized) addresses to clients in the form of LUNs. The mapping between the logical address and physical address is a form of metadata that the array needs to manage. That is typically the most common form of metadata for SAN storage systems. Newer architectures manage additional metadata to implement additional capabilities. For example, snapshots, change tracking for efficient remote replication, deduplication pointers, and compression all involve managing some form of metadata.

The classic metadata structure of traditional storage systems directly links a Logical Address of a Block to the Physical Location of the Block. In this metadata structure, every logical block written, has a physical block linked directly to it. In addition, as most traditional storage systems were architected for a spinning disk storage medium optimized for sequential writes the address of the logical address affects the physical location that the data is stored. This can lead to an unbalanced storage array that can suffer from hot-spots as specific address space ranges may experience more performance/input-output operations per second (IOPs) than other address space ranges.

Embodiments of the present disclosure may support a flash/random access medium. For example, embodiments of the present disclosure may include a metadata structure that completely decouples the Logical Block Address space address from the physical one. This is done by leveraging a multi-layer architecture.

Figure 3:
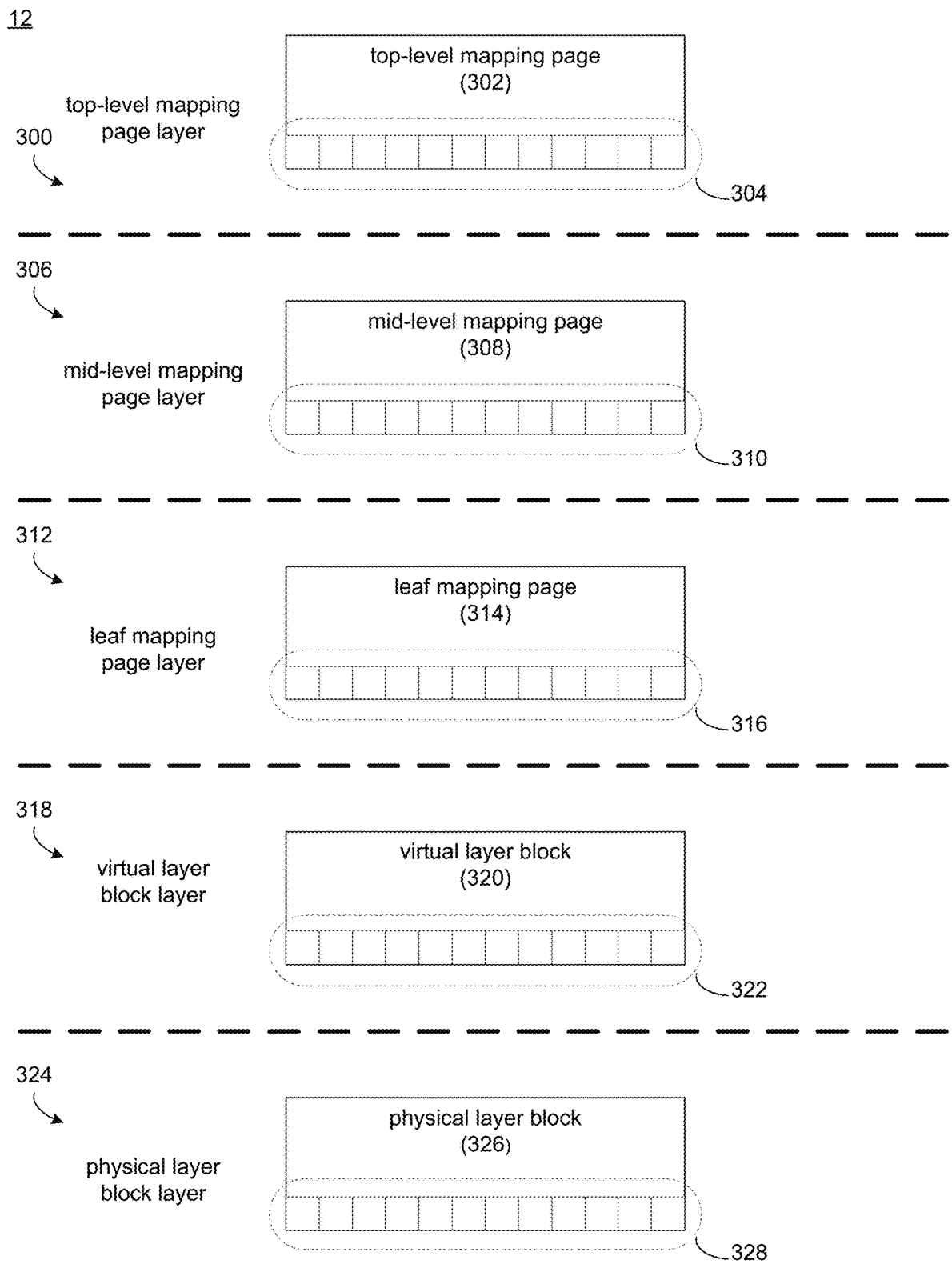
Figure 4:
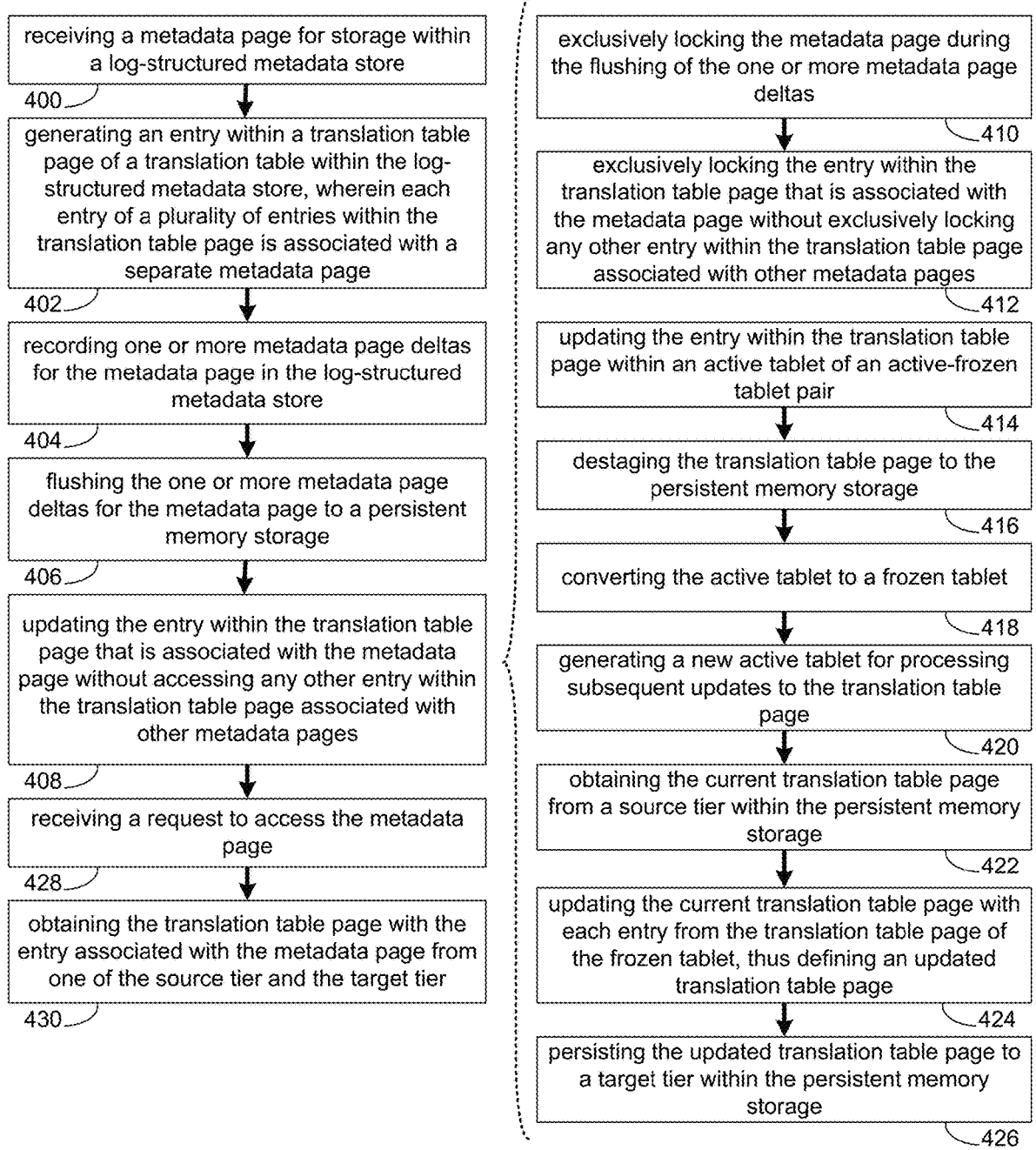
FIG. 4 is an example flowchart of the metadata page management process of FIG. 1 according to one or more example implementations of the disclosure.

Referring also to FIG. 3, a storage system may generally include a mapper layer which is structured as a file system with various layers of pages and blocks. In some implementations, the combination of various mapper layers may be referred to as a mapper metadata tree. While the following example includes metadata "blocks", it will be appreciated that other units of data storage may be used within the scope of the present disclosure. In some implementations, a top-level mapping page layer (e.g., top-level mapping page layer 300) may include top-level mapping page pages (e.g., top-level mapping page 302) with a plurality of entries (e.g., plurality of entries 304) that map or point to a plurality of entries of one or more mid-level mapping pages. A mid-level mapping page layer (e.g., mid-level mapping page layer 306) may include mid-level mapping page pages (e.g., mid-level mapping page 308) with a plurality of entries (e.g., plurality of entries 310) that map or point to a plurality of entries of one or more leaf mapping pages. A leaf mapping page layer (e.g., leaf mapping page layer 312) may include leaf mapping page pages (e.g., leaf mapping page 314) with a plurality of entries (e.g., plurality of entries 316) that map or point to a plurality of entries of one or more virtual layer blocks. Leaf mapping page layer 312 may represent various ranges of Logical Block Addresses (LBAs). For example, each entry of the plurality of entries (e.g., plurality of entries 316) of the leaf mapping page (e.g., leaf mapping page 314) may be associated with a LBA range. In some implementations, the combination of top-level mapping page layer 300, mid-level mapping page layer 306, and leaf mapping page layer 312 may be organized in a "tree" data structure where each leaf mapping page is a "leaf" of the "tree" data structure that corresponds to a specific LBA range. Accordingly, each leaf mapping page (e.g., leaf mapping page 314) may hold mapping of a LBA to a virtual layer block. It will be appreciated that other data structures may be used within the scope of the present disclosure to organize the first layer.

In some implementations, a virtual layer block layer (e.g., second layer 318) may include virtual layer blocks (e.g., virtual layer block 320) with a plurality of entries (e.g., plurality of entries 322) that map to a plurality of entries of one or more physical data blocks. The virtual layer block layer (e.g., virtual layer block layer 318) may generally isolate the logical address of a block from the physical location of the block. For example, a virtual layer block (e.g., virtual layer block 308) may encapsulate the physical location of user data and allow relocation without updating leaf mapping pages (e.g., leaf mapping page 314). Accordingly, the virtual layer block layer (e.g., virtual layer block layer 318) may decouple the Logical Block Address space address from the physical one.

In some implementations, a physical data block layer (e.g., physical data block layer 324) may include physical data blocks (e.g., physical data block 326) with a plurality of entries or portions (e.g., plurality of entries 328) that are configured to store user data. In this manner, physical data block layer 324 may describe the physical location of user data in a storage system. In some implementations, each physical data block (e.g., physical data block 326) may have a predefined amount of storage capacity for storing data (e.g., user data).

The Metadata Page Management Process:

Referring also to FIGS. 4-9 and in some implementations, metadata page management process 10 may receive 400 a metadata page for storage within a log-structured metadata store. An entry may be generated 402 within a translation table page of a translation table within the log-structured metadata store, wherein each entry of a plurality of entries within the translation table page is associated with a separate metadata page. One or more metadata page deltas for the metadata page may be recorded 404 in the log-structured metadata store. The one or more metadata page deltas for the metadata page may be flushed 406 to a persistent memory storage. In response to flushing the one or more metadata page deltas for the metadata page, the entry within the translation table page that is associated with the metadata page may be updated 408 without accessing any other entry within the translation table page associated with other metadata pages.

In some implementations, metadata page management process 10 may allow for management of locking semantic of the log-structured metadata page itself to protect the entry without requiring locking (or even loading) of the entire associated page. For example, storage systems have components whose responsibility is to map a user-visible logical address space to an internal physical address space, and implement various features such as snapshots, data compression, data deduplication, etc. Such mapping and features may rely on different types of metadata to be implemented. This metadata (e.g., Tops, Mids, Leafs, Virtual Logical Blocks (VLBs) pointing to Physical Large Blocks (PLBs), etc.) are typically stored persistently as, e.g., four kilobyte blocks on drives and different metadata blocks reference each other by their block-addresses. These are typically known as metadata pages.

Figure 5:
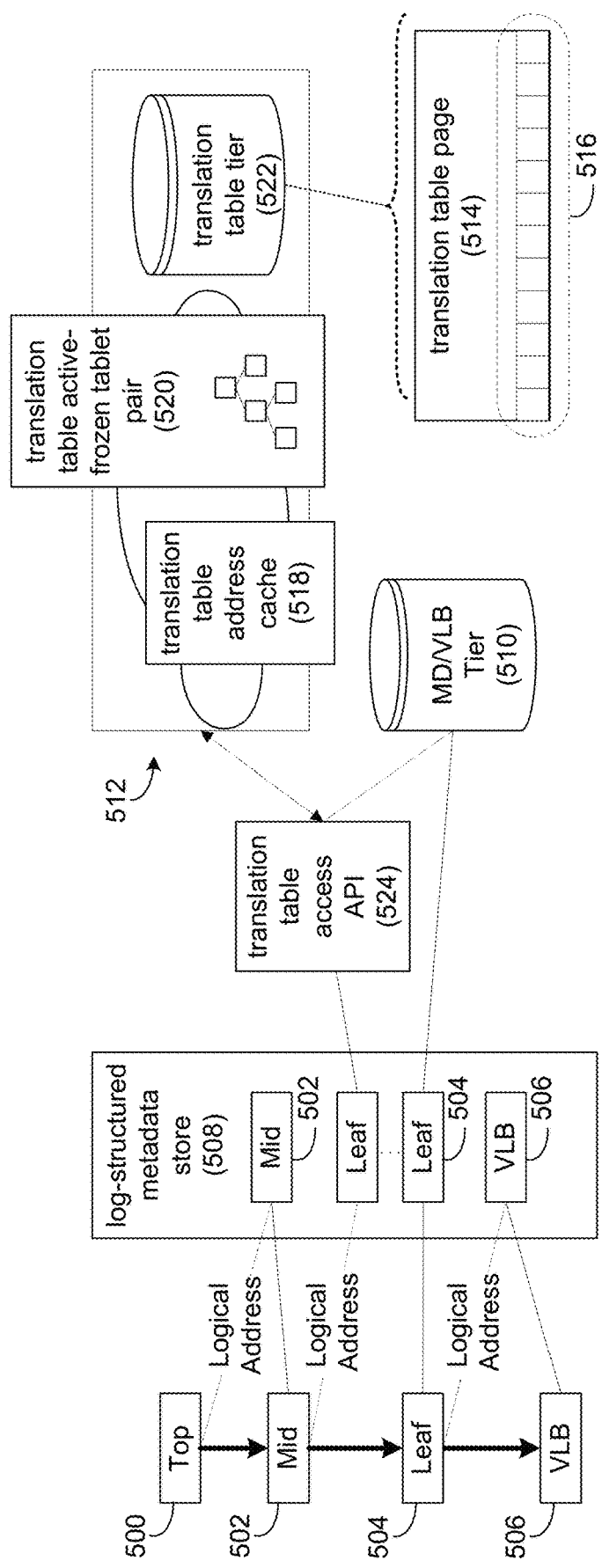
FIGS. 5-7 are example diagrammatic views of the storage system of FIG. 1 according to one or more example implementations of the disclosure.

Access to these metadata pages may be common between threads of operation with some of these threads requiring exclusive access. Conventional designs for metadata access typically involve obtaining exclusive access to the entire metadata page for any changes applied to it regardless of the amount of content on that page that is the focus of the operation. This creates contention between threads, which typically leads to increased latency that becomes visible to external clients. With the introduction of processing metadata pages in a log-structured system, the number of metadata pages accessed is potentially increased due to a translation table, thus adding to possible contention. For example and as shown in FIG. 5, suppose that a number of metadata pages (e.g., metadata pages 500, 502, 504, 506) are processed by a storage system. In this example, suppose that metadata page 500 is a top-level mapping page; metadata page 502 is a mid-level mapping page; metadata page 504 is a leaf mapping page; and that metadata page 506 is a virtual layer block. In this example, top-level mapping page 500 may map or include an entry mapping to mid-level mapping page 502; mid-level mapping page 502 may map or include an entry mapping to lead mapping page 504; leaf mapping page 504 may map or include an entry mapping to virtual layer block 506. In some implementations, some or all of these metadata pages may be stored in a log-structured metadata store (e.g., log-structured metadata store 508). Specifically, metadata pages 502, 504, and 506 are stored or cached in log-structured metadata store 508. Log-structured metadata store 508 may include a log data structure that stores data temporarily until the data is persisted. In some implementations, log-structured metadata store 508 may be a ring buffer configured to add new entries to a "head" of the ring buffer and to remove entries from a "tail" of the ring buffer. However, it will be appreciated that non-ring buffers may be used within the scope of the present disclosure.

Now, suppose a request is received by storage system 12 to access virtual layer block 506. In this example, metadata page management process 10 may traverse from a logical top page (e.g., top-level mapping page 500) down to the virtual page (e.g., virtual layer block 506). The metadata logical addresses are used to find the next metadata page in the chain. Each address may belong to a metadata page that is currently in cache. If not present (e.g., a cache miss), that same address can be used to load the physical page to metadata cache memory 508 from disk (e.g., metadata tier 510). In the proposed model (right) the chain traversal is the same up until the page is not in cache. For a cache miss, the physical location of the page needs to read from a separate metadata page (as this address can now change).

In some implementations, the physical address of the metadata page may be an index or entry within a translation table. A translation table (e.g., translation table 512) is a data structure including a plurality of translation table pages (e.g., translation table page 514) the store entries (e.g., plurality of entries 516) for respective metadata pages describing the physical location or physical address of the metadata page within a metadata tier (e.g., metadata tier 510). For example, translation table 512 may include a translation table address cache (e.g., translation table address cache 518) that caches addresses for metadata pages as cached entries from a translation table page (e.g., translation table page 514). Updates or new entries may be initially cached in translation table address cache 518. As will be discussed in greater detail below, translation table 512 may include a translation table active/frozen tablet pair (e.g., translation table active/frozen tablet pair 520). In some implementations, the combination of an active and a frozen tablet may allow updates to entries and/or new entries to be destaged to persistent memory storage (e.g., translation table tier 522) without data loss. In some implementations, translation table tier 522 may represent persistent memory storage for storing or persisting translation table pages (e.g., translation table page 514).

Continuing with the above example, suppose that leaf mapping page 504 is not present in log-structured metadata store 508. Accordingly, metadata page management process 10 may obtain a physical address for leaf mapping page 504 from translation table 512. For example, metadata page management process 10 may use a translation table access application programming interface (API) (e.g., translation table access API 524) to manage access between log-structured metadata store 508, metadata tier 510, and translation table 512. In this example and in response to a cache miss in log-structured metadata store 508, metadata page management process 10 may use translation table access API 524 to provide a request to translation table 512 to obtain the physical address for leaf mapping page 504 within metadata tier 510. For example, metadata page management process 10 may first check translation table address cache 518 for the associated entry. If the entry is located within translation table address cache 518 (e.g., translation table page 514 is in translation table address cache 518), metadata page management process 10 obtains the address from the particular entry. If the entry is not located within translation table address cache 518, metadata page management process 10 checks translation table active/frozen tablet pair 520. If the entry is located within translation table active/frozen tablet pair 520 (e.g., translation table page 514 is in translation table active/frozen tablet pair 520), metadata page management process 10 obtains the address from the particular entry. As will be discussed in greater detail below, obtaining the address from translation table active/frozen tablet pair 520 may include updating a persisted copy of the entry with change records within translation table active/frozen tablet pair 520. If the entry is not located within translation table active/frozen tablet pair 520, metadata page management process 10 obtains the entry from persistent memory storage within translation table tier 522 (e.g., from translation table page 514 in translation table tier 522). Once the address is obtained from translation table 512, metadata page management process 10 reads the actual physical address from metadata tier 510 and loads leaf mapping page 504 into log-structured metadata store 508.

As will be discussed in greater detail below, multiple metadata pages may have addresses stored in separate entries within the same translation table page, resulting in locking of entire translation table page during updates of an individual metadata page and/or during destaging of the translation table page. Therefore, to reduce contention, the existing common page access model used for other metadata pages may be replaced by a set of APIs that may accompany a model to protect the entry in the metadata page by tracking changes within the translation table tier. As such, this may introduce multiple layers of in-memory caching to avoid additional IO access to read the translation table pages. The caching favors individual mapping addresses over entire metadata pages and may be relatively localized to a current active data set.

In some implementations, metadata page management process 10 may receive 400 a metadata page for storage within a log-structured metadata store. For example, storage system 12 may receive 400 a plurality of metadata pages (e.g., metadata pages 500, 502, 504, 506) configured to store user data (i.e., data stored by and accessed by users of storage system 12). A metadata page may be organized or defined by a total amount of logical address space where various portions of logical address space may be separately addressable. For example and in some implementations, metadata logical address space may define the plurality of metadata pages (e.g., metadata pages 500, 502, 504, 506). Each metadata page may include a predefined amount of storage capacity (e.g., two megabytes). For example, metadata page 500 may include a capacity of e.g., two megabytes with a logical address of 0 megabytes to two megabytes. Similarly, metadata page 502 may include two megabytes of logical address space with a logical address of 2 megabytes to four megabytes. In this manner, each of metadata pages 500, 502, 504, 506 may be separately accessible. In some implementations, metadata page management process 10 may implement a translation table (e.g., translation table 512) to map logical address space to a physical address space for a particular metadata page. Metadata pages may be cached based upon a logical address. As such, logical addresses may be modified without updating a physical address associated with the metadata page by virtue of the translation table (e.g., translation table 512).

Figure 6:
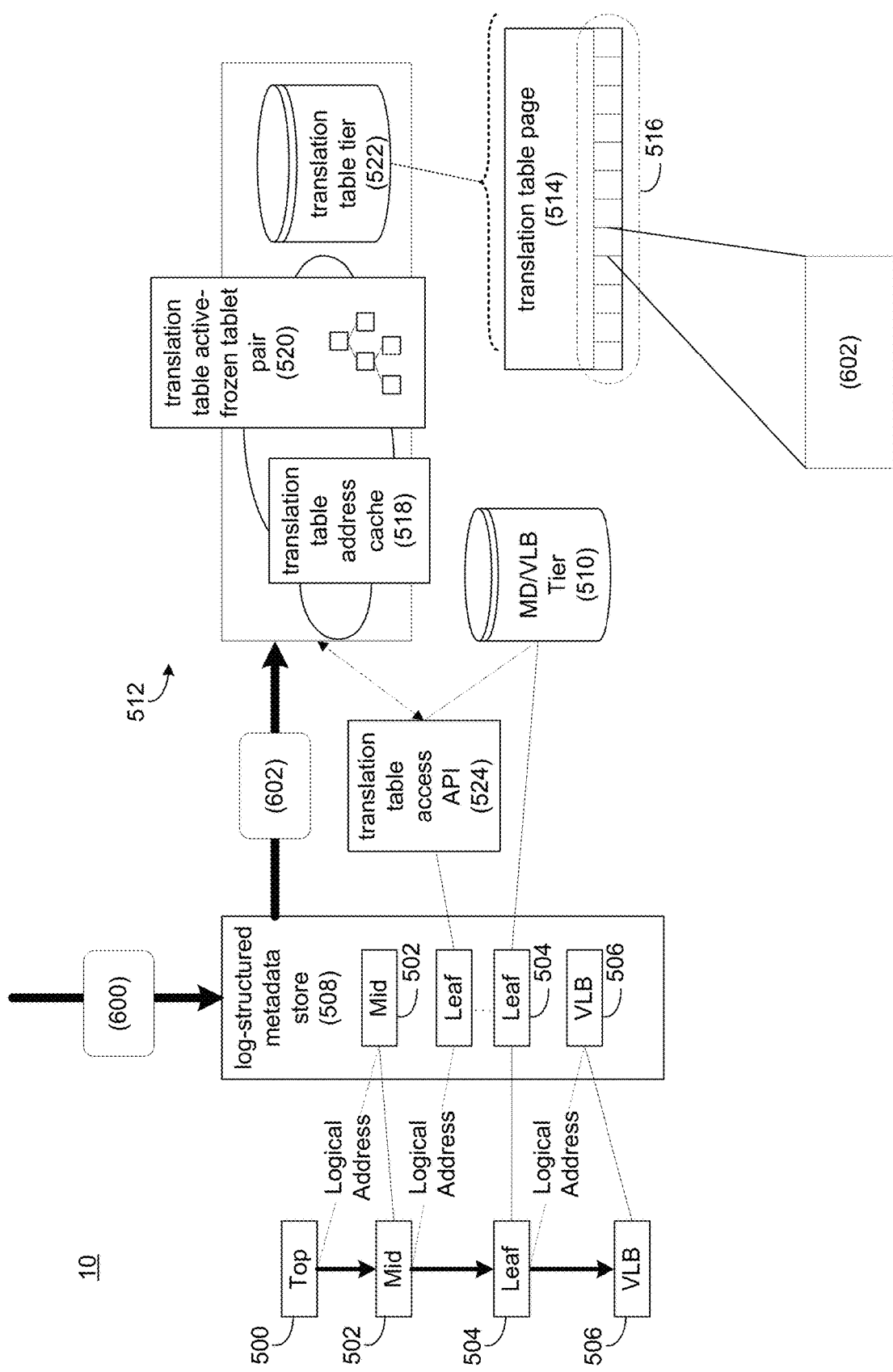

In some implementations, metadata page management process 10 may generate 402 an entry within a translation table page of a translation table within the log-structured metadata store, wherein each entry of a plurality of entries within the translation table page is associated with a separate metadata page. For example and referring also to FIG. 6, suppose that metadata page management process 10 receives 400 a metadata page (e.g., IO request 600 that facilitates the creation of metadata page 504). In this example, metadata page management process 10 may cache or temporarily store a copy of metadata page 504 in log-structured metadata store 508. In response to storing metadata page 504 in log-structured metadata store 508, metadata page management process 10 may generate 402 an entry (e.g., entry 602) for inclusion in a translation table page (e.g., translation table page 514). Entry 602 may include a physical address for metadata page 504. In some implementations, each entry of a plurality of entries (e.g., plurality of entries 516) within translation table page 514 is associated with a separate metadata page. As shown in FIG. 6, translation table access API 524 may provide a copy of the entry (e.g., 602) to translation table 512. Entry 602 may be cached in translation table address cache 518 and after processing through translation table active/frozen tablet pair 520, entry 602 may be stored in translation table page 514. In this manner and as will be discussed in greater detail below, metadata page management process 10 is able to individually access each entry that is uniquely associated with a separate metadata page.

In some implementations, metadata page management process 10 may record 404 one or more metadata page deltas for the metadata page in the log-structured metadata store. For example and referring also to FIG. 7, metadata page management process 10 may store updates or "deltas" for a metadata page (i.e., metadata page delta 700) rather than doing a full read modify process. Metadata page deltas may be aggregated in data containers called "tablets"; first in log-structured metadata store 508 in an "active tablet" until the active tablet is flushed to persistent memory storage (e.g. metadata tier 510).

Figure 7:
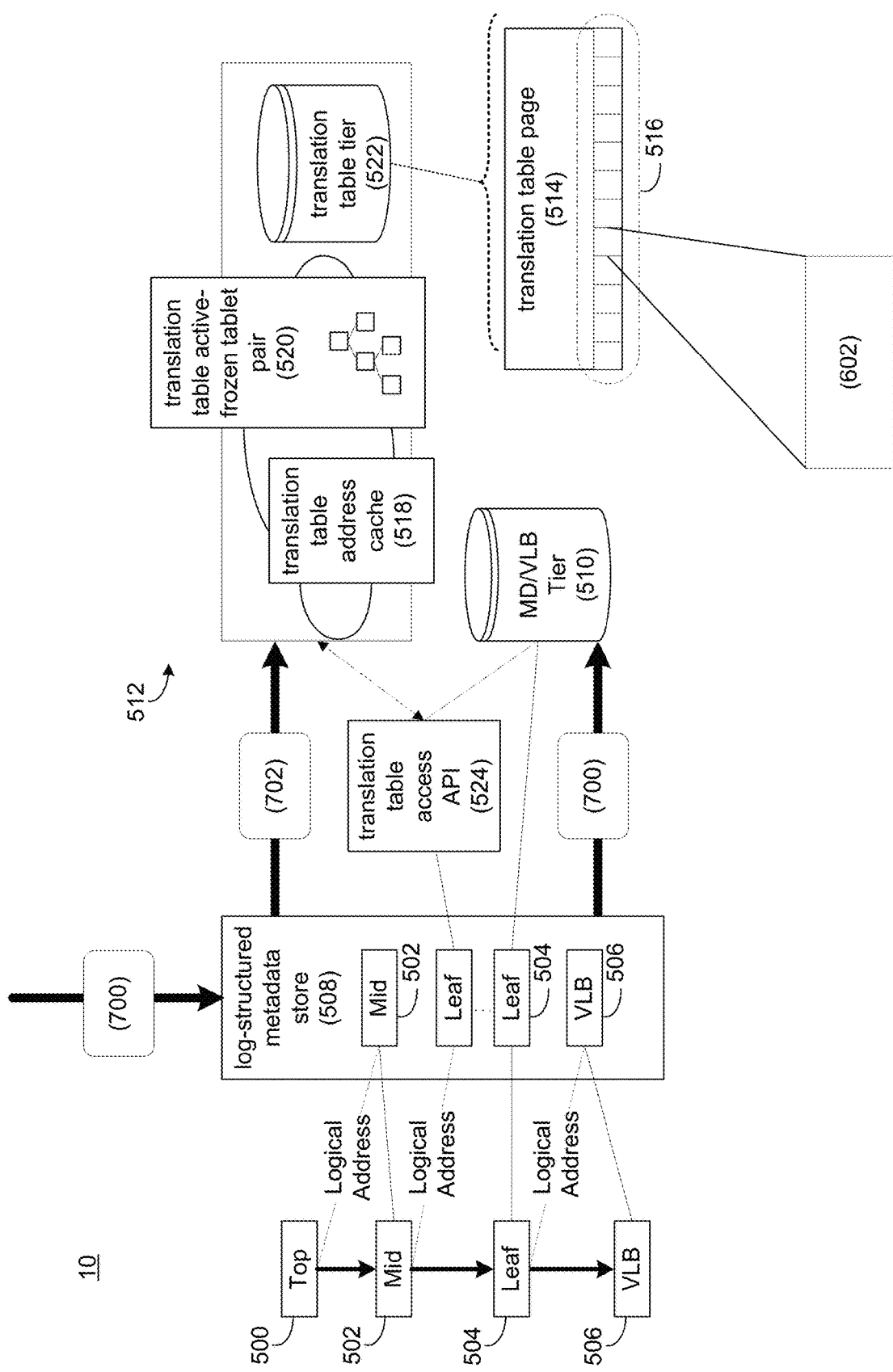
Figure 8:
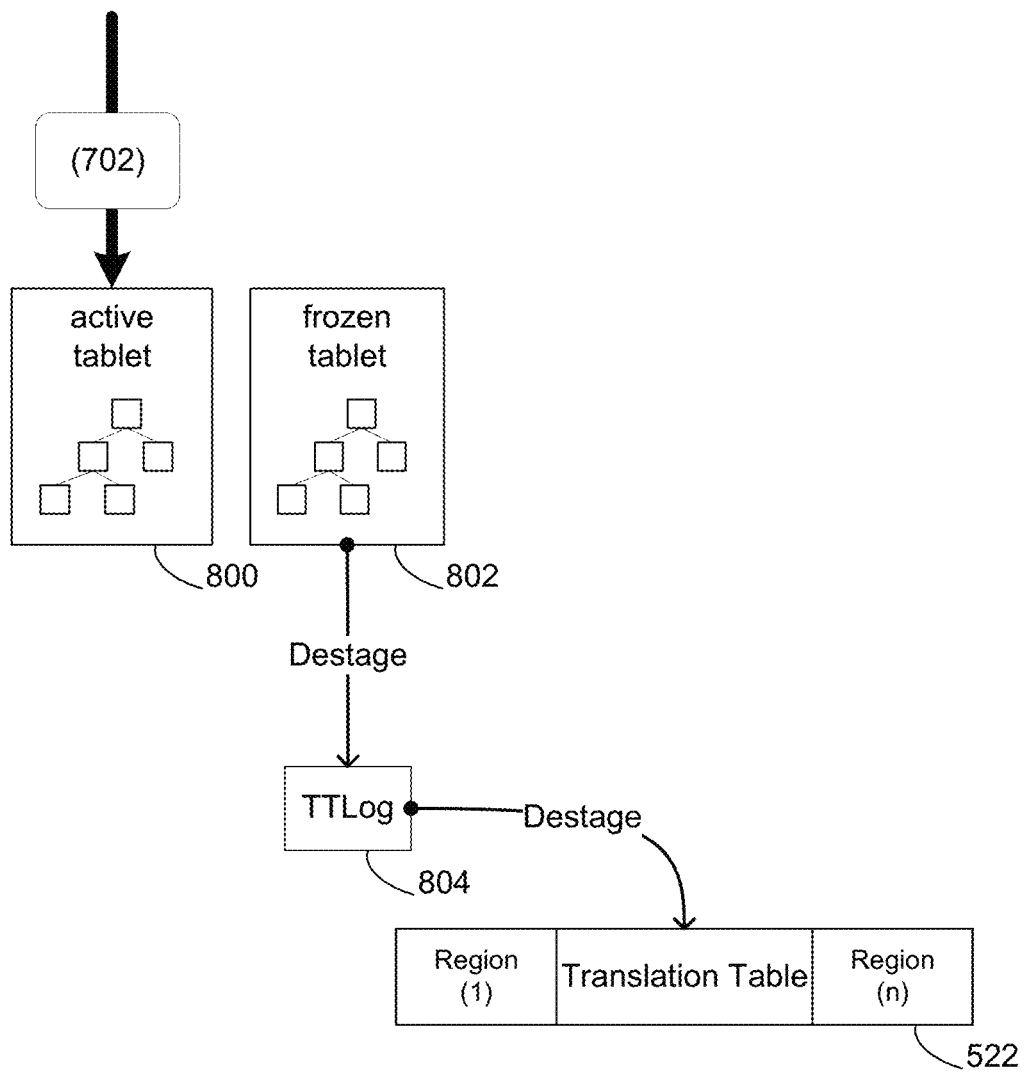
FIGS. 8-9 are example diagrammatic views of the metadata page management process of FIG. 1 according to one or more example implementations of the disclosure. Like reference symbols in the various drawings indicate like elements.

In some implementations, metadata page management process 10 may flush 406 the one or more metadata page deltas for the metadata page to a persistent memory storage. For example, when the active tablet is full, metadata page management process 10 may destage or flush the active tablet to persistent memory storage. When flushing the active tablet, metadata page management process 10 may convert the active tablet to a "frozen tablet" to prevent any further changes from being made therein. Instead, metadata page management process 10 may record 404 any subsequent metadata page deltas to a new active table. Accordingly, the destaging or flushing of deltas may be detached from log-structured metadata store 508, meaning that this process does not destage up-to-date pages to metadata tier 510 and does not update to log-structured metadata store 508. This allows destaging to not block user writes, since a write operation is adding new deltas to the active tablet. As shown in FIG. 7, metadata page management process 10 may flush 406 metadata page delta 700 from log-structured metadata store 508 to persistent memory storage (e.g., metadata tier 510).

During the metadata flush, the dirty pages of log-structured metadata store 508 may be written to persistent memory storage (e.g., metadata tier 510). For log-structured metadata pages, these pages may be combined into larger sets and written out together. When this occurs, the physical address for the metadata page may change. As such, the translation table that maintains these physical addresses may need to be updated. This may be handled by generating entry updates for the address which is logged in the translation table page.

In some implementations and in response to flushing the one or more metadata page deltas for the metadata page, metadata page management process 10 may update 408 the entry within the translation table page that is associated with the metadata page without accessing any other entry within the translation table page associated with other metadata pages. For example, as the physical address for a metadata page (e.g., metadata page 504) changes when metadata page 504 and/or metadata page delta 700 are flushed to metadata tier 510, metadata page management process 10 updates 408 the entry (e.g., entry 602) within the translation table page 514 that is associated with metadata page 504 without accessing any other entry (e.g., other of entries 516) within translation table page 514 associated with other metadata pages (e.g., metadata pages 500, 502, 506). Continuing with the above example, the updates to entry 602 may be recorded as entry update 702 that is provided by translation table access API 524 to translation table 512.

In some implementations, updating 408 the entry within the translation table page that is associated with the metadata page includes exclusively locking 410 the metadata page during the flushing of the one or more metadata page deltas; and exclusively locking 412 the entry within the translation table page that is associated with the metadata page without exclusively locking any other entry within the translation table page associated with other metadata pages. For example, when flushing 406 metadata page 504, metadata page management process 10 may exclusively lock 410 (i.e., prevent any other thread or storage node from accessing metadata page 504). Additionally, metadata page management process 10 may exclusively lock 412 entry 602 within translation table page 514 that is associated with metadata page 504 without exclusively locking any other entry within translation table page 514 that are associated with other metadata pages (e.g., metadata pages 500, 502, 506). In this manner, multiple metadata pages that have entries in the same translation table page may be flushed in parallel (or have metadata page deltas associated with particular metadata pages flushed in parallel) by exclusively locking 412 only their individual entries of the translation table page. Accordingly, flushing of metadata pages and/or metadata page deltas will not exclusively lock entire translation table pages.

In some implementations, updating 408 the entry within the translation table page that is associated with the metadata page includes updating 414 the entry within the translation table page within an active tablet of an active-frozen tablet pair. In a similar manner to the metadata page delta flushing model, updates to entries may be logged in data containers called "tablets". Tablets may be organized in an "active-frozen tablet pair" where an active tablet (e.g., active tablet 800) receives entry updates (e.g., entry update 702). In some implementations, active tablet 800 may be organized as a binary tree of entry updates. For example, upon writing entry update 702 to active tablet 800, metadata page management process 10 may sort the entry updates based upon, at least in part, an insertion order. In other words, each entry update may be sorted in the binary tree structure within active tablet 800 based on when the entry update was received. While a binary tree structure has been described, it will be appreciated that various sorting algorithms or data structures may be used within the scope of the present disclosure.

In some implementations, metadata page management process 10 may destage 416 the translation table page to the persistent memory storage. Destaging 416 the translation table page to the persistent memory storage may generally include flushing or writing the contents of the active tablet to the translation table tier. For example, suppose active tablet 800 is part of translation table active/frozen tablet pair 520 along with frozen tablet 802. In this example, metadata page management process 10 destages 416 the contents of frozen tablet 802 to a translation table log (e.g., TTlog 804). As will be discussed in greater detail below, translation table log 804 may combine a previous version of the translation table page from translation table tier 522 with the entry updates. From the translation table log (e.g., TTlog 804), updated translation table pages are destaged to particular regions of persistent memory storage within translation table tier 522.

In some implementations, destaging 416 the translation table page includes: converting 418 the active tablet to a frozen tablet; and generating 420 a new active tablet for processing subsequent updates to the translation table page. For example and referring also to FIG. 9, when active tablet 800 receives a threshold number of, or total amount of memory of, entry updates, metadata page management process 10 destages 416 the contents of active tablet 800 to a persistent memory storage (e.g., translation table tier 522). However, using the active-frozen tablet model, metadata page management process 10 generates 420 a new active tablet (e.g., new active tablet 900) and the current active tablet is converted 418 into a frozen tablet (e.g., frozen tablet 800'). For example, entry updates to translation table pages may be recorded in new active tablet 900 which may be isolated from a destage of the associated translation table page from frozen table 800'. In some implementations, metadata page management process 10 may utilize a frozen tablet during a translation table flush while isolating active data from frozen data.

In some implementations, destaging 416 the translation table page includes: obtaining 422 the current translation table page from a source tier within the persistent memory storage; updating 424 the current translation table page with each entry from the translation table page of the frozen tablet, thus defining an updated translation table page; and persisting 426 the updated translation table page to a target tier within the persistent memory storage. For example, when destaging 416 entry update 704, metadata page management process 10 obtains 422 a current version of the translation table page (e.g., translation table page 514) from a source tier (e.g., translation table tier 902) using translation table log 804. Entry update 704 is used to update 424 the current translation table page (e.g., translation table page 514) to define an updated translation table page (e.g., updated translation table page 514'). Metadata page management process 10 persists 426 the updated translation table page (e.g., updated translation table page 514') to a target tier within the persistent memory storage (e.g., translation table tier 904).

Figure 9:
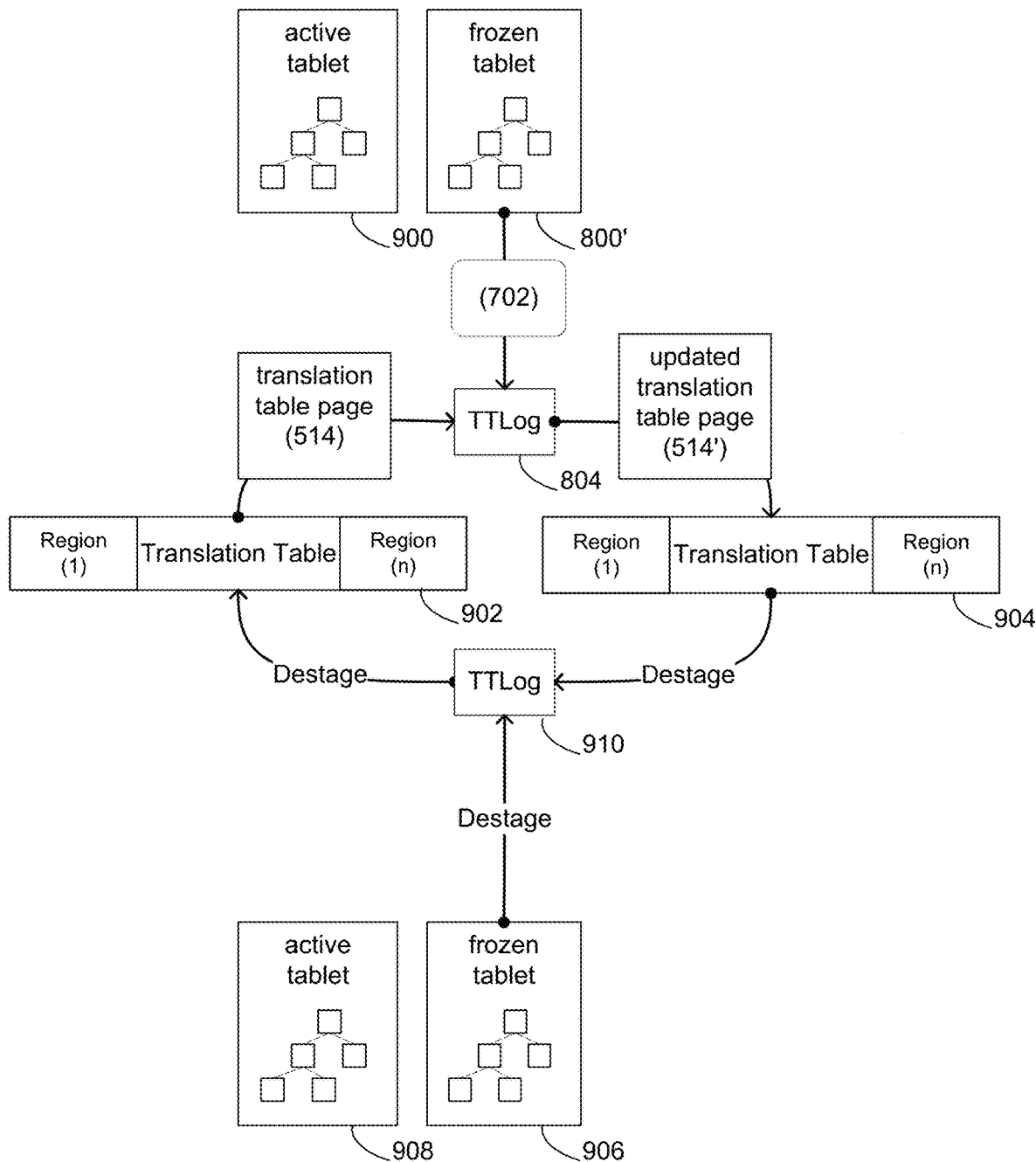

In some implementations and as shown in FIG. 9, metadata page management process 10 may use multiple active-frozen tablet pairs to loop between two physical translation table tiers (e.g., translation table tier 902 and translation table tier 904) associated with translation table tier 522. In operation, each tier may swap roles depending on the active-frozen tablet pair destaging. For example, during destage of frozen tablet 800', content may be read from a source tier (e.g., translation table tier 902) and combined with the entry updates from the frozen tablet (e.g. frozen tablet 800') and stored in the target tier (e.g., translation table tier 904). During destage of frozen tablet 906, new entry updates may stored in active tablet 908 and content may be read from a source tier (e.g., translation table tier 904) and combined with the entry updates from the frozen tablet (e.g. frozen tablet 800') using translation table log 910 and stored in the target tier (e.g., translation table tier 902).

In some implementations, metadata page management process 10 may receive 428 a request to access the metadata page and may obtain 430 the translation table page with the entry associated with the metadata page from one of the source tier and the target tier. For example, a lookup flow may be used for going through the various caches and ultimately to the translation table tier. For example, metadata page management process 10 may process a request to access a metadata page (e.g., metadata page 504). In this example, first metadata page management process 10 searches translation table address cache 518, then active-frozen tablet pair 520 to determine if the entry is dirty, and finally going to the persistent memory storage of translation table tier 522 if the entry is not found beforehand. In this example, the order and direction are important to ensure the most current value of the address is returned.

In some implementations, metadata page management process 10 may allow access during destage, depending on the state of the region of the translation table. For example, looking up the translation table page may be directed to the source tier (which includes the frozen delta tablet as the tier itself does not have these changes) or to the target tier (the translation table page excluding any entry updates in the frozen tablet as that memory may have been reclaimed that the target tier region should now include all these changes).

Typically mapping operations work by accessing an entire metadata page, regardless of the amount of data they may act upon from that metadata page. For example, suppose metadata page management process 10 receives 428 a request to read an entire mid-level mapping page in order to extract (or change) one 8-byte pointer. In some implementations, metadata page management process 10 may need the entire metadata page to be protected (locked) as well as be current with all changes made (if still dirty). For translation table access, the metadata page may be protected via an API that may restrict access to just the metadata required. In this example, the one 8-byte pointer from the metadata page. The API may check first to see if the entry exists in either the active or frozen tablet regardless of the presence of the metadata page in cache itself. If the value is not found, the API may then read the page from either cache or storage and extract the entry. Depending on the state of the translation table destage, either the source or target tier would be read from to obtain 430 the non-dirty data.

Below is a table summarizing the access to both the translation table page (TTPage) and entry update (TT Entry Update).

|  | MD Access | MDDestage | TTDestage (TT) |
|---|---|---|---|
| MDPage | Read or Write Locked | Write Locked | NA |
| TTPage | Read Locked Only | NA | NA/Invalidated |
| TT Entry Update | SpinLock or lockless (lookup) | SpinLock (update) | lockless (frozen) |

In some implementations, the association between the metadata page and the translation table entry may always be one-to-one and an associated exclusive lock on the metadata page may protect the entry during updates to the translation table page. For example, an attempted read from a peer node or another operation that wants to modify the same metadata page may be serialized behind the metadata page lock before it may proceed to look up the translation table page entry.

GENERAL

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method for providing on-demand high-availability service on a storage cluster, comprising:

adding a new single-node appliance to the storage cluster, wherein the storage cluster includes one or more original single-node appliances and an internal remote system configured to facilitate intra-cluster orchestration operations;

generating a remote system object representing the new single-node appliance in the internal remote system;

determining an appliance identifier for the remote system object representing the new single-node appliance;

in response to determining that the appliance identifier for the remote system object representing the new single-node appliance is a non-zero appliance identifier, establishing an internal remote session between the remote system object and the storage cluster;

presenting the one or more original single-node appliances and the new single-node appliance as a unified system; and provisioning one or more protected storage volumes on any of the single-node appliances included in the unified system, wherein provisioning the one or more protected volumes includes identifying the internal remote session with a matching non-zero appliance identifier.

2. The computer-implemented method of claim 1, wherein provisioning the one or more protected volumes includes selecting a destination appliance to at least partially replicate data onto.

3. The computer-implemented method of claim 1, wherein provisioning the one or more protected volumes includes automatically establishing the internal remote session between single-node appliances in the unified system for a protected volume from the one or more protected volumes.

4. The computer-implemented method of claim 1, further comprising:

removing a selected single-node appliance from the storage cluster.

5. The computer-implemented method of claim 4, wherein removing the selected single-node appliance from the storage cluster includes excluding the selected single-node appliance from a list of possible destinations, such that no new protected volumes can be created thereon.

6. The computer-implemented method of claim 5, wherein removing the selected single-node appliance from the storage cluster includes locating and terminating any internal remote sessions to the selected single-node appliance.

7. A computer program product residing on a non-transitory computer-readable medium having a plurality of instructions stored thereon which, when executed by a processor, cause the processor to perform operations comprising:

adding a new single-node appliance to the storage cluster, wherein the storage cluster includes one or more original single-node appliances and an internal remote system configured to facilitate intra-cluster orchestration operations;

generating a remote system object representing the new single-node appliance in the internal remote system;

determining an appliance identifier for the remote system object representing the new single-node appliance;

in response to determining that the appliance identifier for the remote system object representing the new single-node appliance is a non-zero appliance identifier, establishing an internal remote session between the remote system object and the storage cluster;

presenting the one or more original single-node appliances and the new single-node appliance as a unified system; and provisioning one or more protected storage volumes on any of the single-node appliances included in the unified system, wherein provisioning the one or more protected volumes includes identifying the internal remote session with a matching non-zero appliance identifier.

8. The computer program product of claim 7, wherein provisioning the one or more protected volumes includes selecting a destination appliance to at least partially replicate data onto.

9. The computer program product of claim 8, wherein provisioning the one or more protected volumes includes automatically establishing the internal remote session between single-node appliances in the unified system for a protected volume from the one or more protected volumes.

10. The computer program product of claim 7, wherein operations further comprise:

removing a selected single-node appliance from the storage cluster.

11. The computer program product of claim 10, wherein removing the selected single-node appliance from the storage cluster includes excluding the selected single-node appliance from a list of possible destinations, such that no new protected volumes can be created thereon.

12. The computer program product of claim 11, wherein removing the selected single-node appliance from the storage cluster includes locating and terminating any internal remote sessions to the selected single-node appliance.

13. A computing system for providing on-demand high-availability service on a storage cluster, comprising:

a memory; and a processor configured to:

add a new single-node appliance to the storage cluster, wherein the storage cluster includes one or more original single-node appliances and an internal remote system configured to facilitate intra-cluster orchestration operations;

generate a remote system object representing the new single-node appliance in the internal remote system;

determine an appliance identifier for the remote system object representing the new single-node appliance;

in response to determining that the appliance identifier for the remote system object representing the new single-node appliance is a non-zero appliance identifier, establish an internal remote session between the remote system object and the storage cluster;

present the one or more original single-node appliances and the new single-node appliance as a unified system; and provision one or more protected storage volumes on any of the single-node appliances included in the unified system, wherein provisioning the one or more protected volumes includes identifying the internal remote session with a matching non-zero appliance identifier.

14. The computing system of claim 13, wherein provisioning the one or more protected volumes includes selecting a destination appliance to at least partially replicate data onto.

15. The computing system of claim 13, wherein provisioning the one or more protected volumes includes automatically establishing the internal remote session between single-node appliances in the unified system for a protected volume from the one or more protected volumes.

16. The computing system of claim 13, wherein the processor is further configured to:

remove a selected single-node appliance from the storage cluster.

17. The computing system of claim 16, wherein removing the selected single-node appliance from the storage cluster includes excluding the selected single-node appliance from a list of possible destinations, such that no new protected volumes can be created thereon.

* * * * *